Feb. 12, 1957 H. T. LYMAN ET AL 2,781,451

WIDE RANGE RADIO FREQUENCY TUNER

Filed June 8, 1954

INVENTORS:
Harold T. Lyman and
Francis G. Mason,
BY
Owen, McDougall, Williams & Kerch,
ATTORNEYS.

United States Patent Office 2,781,451

Patented Feb. 12, 1957

2,781,451

WIDE RANGE RADIO FREQUENCY TUNER

Harold T. Lyman, Milford, and Francis G. Mason, Weston, Conn., assignors to Aladdin Industries, Incorporated, Nashville, Tenn., a corporation of Illinois

Application June 8, 1954, Serial No. 435,159

7 Claims. (Cl. 250—40)

This invention relates to radio frequency tuners, particularly those of the type adapted to cover an extremely wide frequency range without band switching.

One principal object of the invention is to provide an improved wide range radio frequency tuner which will be virtually free from spurious or unwanted resonance effects.

A further object is to provide an improved wide range radio frequency tuner of the foregoing character having freedom from spurious resonances combined with a high factor of merit or "Q."

Another object is to provide an improved wide range radio frequency tuner in which spurious and unwanted resonances are suppressed or avoided by the provision of novel means, and in which the novel means are arranged to avoid loading effects and, hence, to maintain high "Q."

In some aspects the present invention is an improvement over the invention disclosed in the copending application of Harold T. Lyman, Serial No. 305,629, filed August 21, 1952, and entitled "Wide Range Radio Frequency Tuner."

Figure 1:
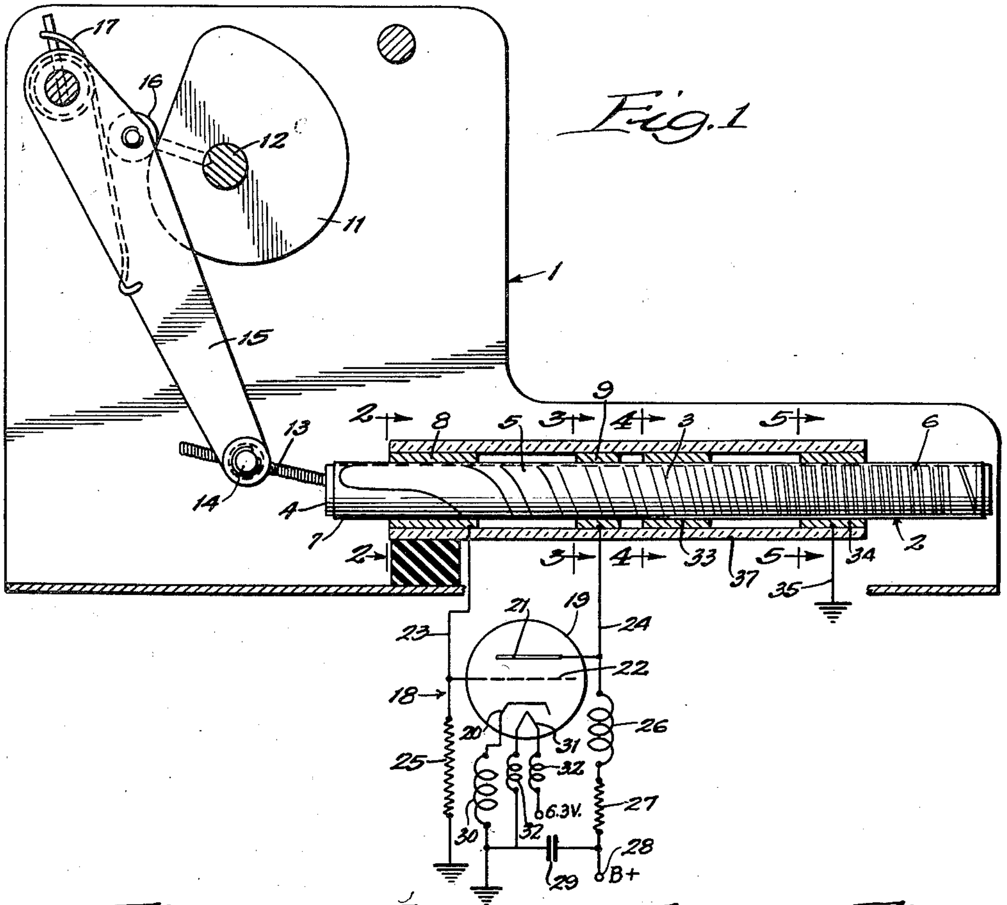
Figure 2:
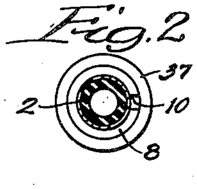
Figure 3:
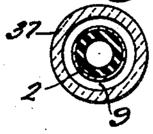
Figure 4:
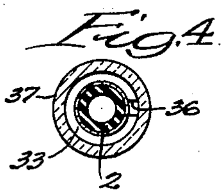
Figure 5:
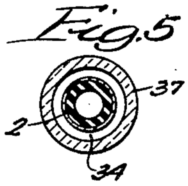

Other objects and advantages of the invention will appear from the following description, taken with the accompanying drawing, in which:

Figure 1 is a partly diagrammatic elevational sectional view of an illustrative embodiment of the invention in the form of a wide range radio frequency tuner.

Figs. 2, 3, 4, and 5 are cross-sectional views taken respectively along lines 2—2, 3—3, 4—4, and 5—5 shown in Fig. 1.

Figure 6:
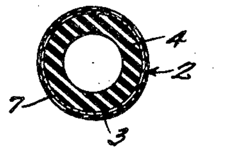

Fig. 6 is an enlarged cross-sectional view of a coil embodied in the tuner of Fig. 1.

Considered in greater detail, Fig. 1 of the drawing shows a purely illustrative embodiment of the invention in the form of a radio frequency tuner 1 adapted to tune over a wide frequency range. Thus, the illustrated tuner is arranged to cover the frequency range from 54 to 890 megacycles. This range embraces the commercial television bands from 54 to 216 megacycles and from 470 to 890 megacycles. The lower of these bands is commonly known as the V. H. F. (very high frequency) television band, while the higher frequency band is commonly known as the U. H. F. (ultra-high frequency) television band. Coverage of the V. H. F. and U. H. F. bands is obtained without any band switching.

As one tuning element, the illustrated tuner 1 comprises a coil 2 formed of a conductive generally helical film or ribbon 3 carried on a cylindrical insulating form 4. While the illustrated coil 2 is cylindrical and has a straight axis, it will be understood that the coil may be formed with an arcuate axis so as to be adaptable for movement along a circular path.

In order to obtain inductance variation, the coil 2 is formed so as to have nonuniform inductance per unit length. To this end, the coil 2 is arranged with nonuniform turn density, increasing from one end portion 5, having low turn density, to the opposite end portion

6 having high turn density. The inductance per unit length of the coil increases progressively between the low inductance end 5 and the high inductance end 6. To minimize both inductance and losses at the low inductance end 5, the width of the ribbon winding 3 is progressively increased between the high inductance end portion 6 and the low inductance end portion 5.

It will be understood that the conductive ribbon 3 may be formed by actually winding a strip of metal on the form 4 or by depositing metal by printed circuit or related techniques in the desired helical form. The latter method of forming the coil generally is preferable. A thin transparent low-loss dielectric film 7 may be applied to the coil 2 to protect the ribbon winding 5 and to serve as electrical insulation for the coil.

In order to transfer energy to and from the coil 2, a pair of energy transfer elements 8 and 9 are arranged in axially spaced relation adjacent the coil 2. Although the elements 8 and 9 may assume various forms, they are illustrated in the form of sleeves disposed around the coil. However, the sleeve 8 is provided with a longitudinal slot 10 extending from one end of the sleeve to the other to interrupt the circumferential continuity of the sleeve and thereby prevent circumferential eddy currents from flowing in the sleeve. This construction reduces the losses in the tuner and increases the "Q."

While it might be feasible to arrange the energy transfer elements 8 and 9 so that they would be in direct conductive engagement with the coil winding 5, it is preferable to insulate the energy transfer elements from the coil so that only capacitive energy transfer can take place between the transfer elements and the coil. In this instance the transfer sleeves 8 and 9 are insulated from the coil winding 5 by the insulating film 7 on the coil, but it will be understood that it would be possible to interpose insulating material between the sleeves and the coil or to provide an air gap between the coil and the sleeves.

Provision is made for effecting relative movement between the coil 2 and the transfer elements 8 and 9 so as to vary the resonant frequency of the tuner 1. In this instance, the transfer elements 8 and 9 are stationary while the coil 2 is adapted to be moved by means of a cam 11 mounted on a rotatable shaft 12. A flexible rod 13 is employed to connect the coil 2 to a pivot 14 mounted on the end of a cam follower arm 15. The cam 11 is engaged by a roller 16 mounted on the follower arm 15. A spring 17 biases the arm 15 in one direction so as to hold the roller 16 against the cam. It will be understood that any number of tuners may be controlled in common by mounting the requisite number of cams on the shaft 12 and providing an individual cam follower for each tuner.

By moving the coil 2, any desired portion of the winding 5 may be brought between the energy transfer elements 8 and 9. When the high inductance end portion 6 of the coil 2 is moved between the transfer elements 8 and 9, the inductance between the elements will be high with the result that the resonant frequency of the tuner will be relatively low. When, on the other hand, the low inductance end portion 5 of the coil 2 is positioned between the energy transfer elements, the inductance between the elements will be low and the resonant frequency of the tuner will be relatively high. It will be understood that the coil is resonated by the capacitances between the sleeves 8 and 9 and between the coil and the sleeves, in common with circuit and distributed capacitances.

The tuner may be connected into any circuit for which tuning is desired. Thus, as shown in Fig. 1, the tuner 1 is utilized to tune a high frequency oscillator 18 utilizing an electron discharge tube 19 having a cathode 20, an anode 21, and a grid 22. The tuner 1 is connected into the circuit simply by running a lead 23 between the energy transfer element 8 and the grid 22, and another lead 24 between the transfer element 9 and the anode 21. A grid biasing resistor 25 is connected between the grid 22 and ground. A nonresonant or aperiodic choke 26 and a resistor 27 are connected in series between the anode 21 and a terminal 28 charged with a suitable anode supply voltage. A bypass capacitor 29 is connected between the terminal 28 and ground. In order that the cathode 20 may float above ground potential, a nonresonant or aperiodic choke 30 is connected between the cathode and ground. The electron tube 19 also includes a cathode heater 31 supplied with voltage through a pair of aperiodic chokes 32.

If only the structure thus far described were provided, the tuner 1 would be operative and would be of some practical value. However, the tuner would be susceptible to spurious resonance effects arising principally in that portion of the coil 2 not between the sleeves 8 and 9. In particular, the high inductance end of the coil extending to the right of the sleeve 9 tends to be self-resonant at one or more high frequencies which may at times be close to the resonant frequency governed by the portion of the coil 2 between the sleeves 8 and 9. Because of the inductive and capacitive coupling between the active portion of the coil extending between the sleeves 8 and 9 and the inactive portion extending beyond the sleeves, there is a tendency for any self-resonances in the inactive portion to affect the performance of any circuit connected to the sleeves 8 and 9. In the case of the oscillator 18, such self-resonance effects in the inactive portion of the coil tend to reduce the output of the oscillator or even stop the operation of the oscillator at various points in the tuning range of the tuner 1.

Moreover, there may be a tendency for the oscillator to make sudden changes in its frequency of operation as the coil 2 is moved relative to the energy transfer sleeves 8 and 9. Such jumping of the oscillator frequency is generally undesirable since it is desirable for the tuner to effect a smooth, continuous variation in frequency within the desired tuning bands.

In order to suppress spurious resonances, or at least to avoid their undesirable effects, the illustrated tuner 1 is provided with one or more resonance suppressing elements along the path of movement of the coil 2. Two such resonance suppressing elements 33 and 34 are provided in the illustrated embodiment. While the resonance suppressing elements 33 and 34 may assume various forms, they are shown as rings axially alined with the coil 2. The first ring 33 is spaced relatively closely to the right hand energy transfer sleeve 9 so that the high inductance end portion 6 of the coil 2 will be received within the ring 33 shortly after emerging from the transfer sleeve 9, as the coil is moved to the right in varying the resonant frequency of the tuner from its low frequency to its high frequency end. The second resonance suppressing ring 34 is spaced some distance to the right of the first ring 33 so that the coil 2 will enter the ring 34 at a higher frequency setting of the tuner 1. When disposed and proportioned as shown, the rings 33 and 34 will prevent any undesirable effects, due to spurious resonance conditions or the like, in the commercial television bands from 54 to 216 megacycles and from 470 to 890 megacycles. It will be observed that a conductor 35 is connected between the right-hand ring 34 and ground in this instance, but in some cases it may be preferable to insulate this ring from ground. The ring 33 preferably is insulated and left floating. To reduce the loading effect of the ring 33 upon the portion of the coil 2 between the sleeves 8 and 9, the ring 33 is formed from end to end with a longitudinal slot 36. This construction tends to increase the "Q" of the tuner. The ring 34 may be similarly split, but this has generally not been found necessary. In the illustrated construction, the ring 34 is continuous. The rings 33 and 34, as well as the sleeves 8 and 9, may be supported in an insulating tube 37.

The resonance suppressing effects of the rings 33 and 34 are due to a combination of various factors. For example, the rings tend to load the inactive portion of the coil 2, extending outside of the transfer sleeves 8 and 9, so that resonances in the inactive portion tend to be suppressed or at least made less pronounced. Moreover, the rings 33 and 34 tend to decouple the unused portion of the coil from the portion between the sleeves 8 and 9. Furthermore, the rings 33 and 34 reduce the inductance of the portions of the coil under them and thereby shift any self-resonances of these portions out of the tuning range of the coil.

With the arrangement shown, the oscillator 18 will operate continuously and with good output throughout the V. H. F. and U. H. F. commercial television bands. Moreover, the oscillator may be tuned over both of these bands without any noticeable jumps in frequency.

Various modifications, alternative constructions, and equivalents may be employed without departing from the true spirit and scope of the invention as disclosed in the foregoing description and defined in the following claims.

We claim:

1. In a wide range radio frequency tuner, the combination comprising a coil having non-uniform inductance per unit length, first and second energy exchange electrodes adjacent the outside of said coil and spaced axially therealong, said second electrode being spaced a fixed distance in one axial direction from said first electrode, said coil and said electrodes being relatively movable along an axial path to vary the effective inductance between said electrodes, and electrode means disposed along said path in said one direction from said second electrode in fixed relation thereto for suppressing spurious resonances in the portion of said coil extending in said one direction beyond said electrodes.

2. In a wide range radio frequency tuner, the combination comprising a coil having non-uniform inductance per unit length, first and second energy exchange electrodes adjacent the outside of said coil with said second electrode spaced therealong a fixed distance in one axial direction from said first electrode, said coil and said electrodes being relatively movable along an axial path for varying the effective inductance between said electrodes, and a conductive member alined axially with said electrodes and spaced axially along said path in said one direction from said second electrode in fixed relation thereto for suppressing spurious resonances in the portion of said coil extending beyond said electrodes in said one direction.

3. In a wide range radio frequency tuner, the combination comprising first and second generally annular energy exchange electrodes disposed in axially alined relation with said second electrode spaced a fixed distance in one axial direction from said first electrode, a coil having non-uniform inductance per unit length, said coil being received within said electrodes for axial movement therein to vary the effective inductance between said electrodes, and a conductive generally annular member alined axially with said electrodes and spaced axially in said one direction from said second electrode for receiving the portion of said coil extending in said one direction beyond said electrodes and thereby suppressing spurious resonances in said portion.

4. In a wide range radio frequency tuner, the combination comprising a coil having non-uniform inductance per unit length, said coil thereby having a low inductance end and a high inductance end with the unit inductance of said coil increasing progressively in one direction between said ends, first and second conductive energy exchange rings movably receiving said coil with said second ring spaced axially a fixed distance in said one direction from said first ring, means for establishing circuit connections to said rings, said coil and said rings being relatively movable along an axial path for varying the effective inductance between said rings, a third conductive ring axially alined with said energy exchange rings and spaced axially a fixed distance from said second energy ring for receiving said high inductance end of said coil and thereby suppressing spurious resonances therein.

5. In a wide range radio frequency tuner, the combination comprising a coil having non-uniform inductance per unit length, said coil having a low inductance end portion and a high inductance end portion with said inductance per unit length progressively increasing in one direction therebetween, first and second energy exchange rings around said coil with said second ring spaced a fixed distance therealong from said first ring, means for establishing circuit connections with said rings, said coil and said rings being relatively movable along an axial path for varying the effective inductance between said rings, third and fourth conductive rings alined axially with said first and second rings and spaced successive fixed distances in said one direction from said second ring so that said high inductance end portion of said coil will be received successively by said third and fourth rings in the course of relative axial movement between said coil and said rings, said third and fourth rings being effective to suppress spurious resonances in the portion of said coil extending beyond said second ring in said one direction.

6. In a wide range radio frequency tuner, the combination comprising a coil having non-uniform inductance per unit length, said coil having a low inductance end and a high inductance end with the inductance per unit length of said coil progressively increasing in one direction therebetween, first and second energy exchange rings movably receiving said coil with said second ring spaced therealong a fixed distance in said one direction from said first ring, means for establishing circuit connections to said rings, said coil being movable axially through said rings for varying the effective inductance therebetween, third and fourth conductive rings disposed in coaxial relation to said first and second rings and spaced successive fixed distances axially in said one direction from said second ring so that said high inductance end of said coil will be received successively by said third and fourth rings as said coil is moved in said one direction, said third and fourth rings being effective to suppress spurious resonances in the portion of said coil extending in said one direction beyond said first and second rings, at least one of said third and fourth rings being split longitudinally to reduce its loading effect upon said coil.

7. In a wide range radio frequency tuner, the combination comprising a coil having non-uniform inductance per unit length progressively increasing in one direction from one end of said coil to the other end thereof, said coil thereby having a low inductance end portion and a high inductance end portion, first and second energy exchange rings disposed around said coil in axially alined relation thereto with said second ring spaced therealong a fixed distance in said one direction from said first ring, said fixed distance being substantially less than the length of said coil, means for axially moving said coil within said rings to vary the effective inductance therebetween, said inductance between said rings being relatively great when said high inductance end portion of said coil extends between said rings and being relatively small when said low inductance end portion of said coil extends between said rings, at least one of said rings having a longitudinal slot therein to reduce the loading effect thereof upon said coil, a third conductive ring axially alined with said coil and spaced a fixed distance from said second ring in said one direction, a fourth conductive ring axially alined with said coil and spaced axially a fixed distance from said ring, said third and fourth rings successively receiving said high inductance end portion upon movement of said coil in said one direction beyond said second ring, said third and fourth rings thereby being effective to suppress spurious resonances in said high inductance end portion, said third ring having a longitudinal slot formed therein from end to end thereof to reduce the loading effect thereof upon the portion of said coil between said first and second rings.

References Cited in the file of this patent

UNITED STATES PATENTS

| | | |
|---|---|---|
| 2,641,708 | Carlson | June 9, 1953 |
| 2,688,691 | Pan | Sept. 7, 1954 |